(12) United States Patent
Smithson et al.

(10) Patent No.: US 6,898,715 B1
(45) Date of Patent: May 24, 2005

(54) RESPONSE TO A COMPUTER VIRUS OUTBREAK

(75) Inventors: Robert Hugh Smithson, Cheltenham (GB); Andrew Arlin Woodruff, Aylesbury (GB); Anton Christian Rothwell, Aylesbury (GB); Jeffrey Martin Green, Aylesbury (GB); Christopher Scott Bolin, Buckland (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 928 days.

(21) Appl. No.: 09/659,645

(22) Filed: Sep. 12, 2000

(51) Int. Cl.[7] ............................. G06F 11/30; G06F 11/00
(52) U.S. Cl. ...................... 713/200; 713/187; 713/188; 713/201; 714/33; 714/38
(58) Field of Search ................................. 713/187, 188, 713/200, 201; 714/33, 38

(56) References Cited

U.S. PATENT DOCUMENTS

| | | | | |
|---|---|---|---|---|
| 5,440,723 A | * | 8/1995 | Arnold et al. ................. | 714/2 |
| 5,809,138 A | * | 9/1998 | Netiv .......................... | 713/200 |
| 5,889,943 A | * | 3/1999 | Ji et al. ...................... | 713/201 |
| 5,948,104 A | * | 9/1999 | Gluck et al. ................. | 713/200 |
| 6,347,375 B1 | * | 2/2002 | Reinert et al. .............. | 713/200 |
| 6,401,210 B1 | * | 6/2002 | Templeton .................. | 713/200 |
| 6,701,440 B1 | * | 3/2004 | Kim et al. ................... | 713/201 |

* cited by examiner

Primary Examiner—Gilberto Barron
Assistant Examiner—A. Nobahar
(74) Attorney, Agent, or Firm—Zilka-Kotab, PC; Christopher J. Hamaty

(57) ABSTRACT

When a computer virus outbreak is detected, a predefined sequence of steps are automatically or manually followed using rule definitions, that may include office hours, to invoke anti-virus counter-measures. The counter-measures can include reducing virus notification, increasing scanning options, blocking E-mail attachments, hiding E-mail address books and the like. The predetermined sequence of actions may be varied with the time of day and day of week.

42 Claims, 15 Drawing Sheets

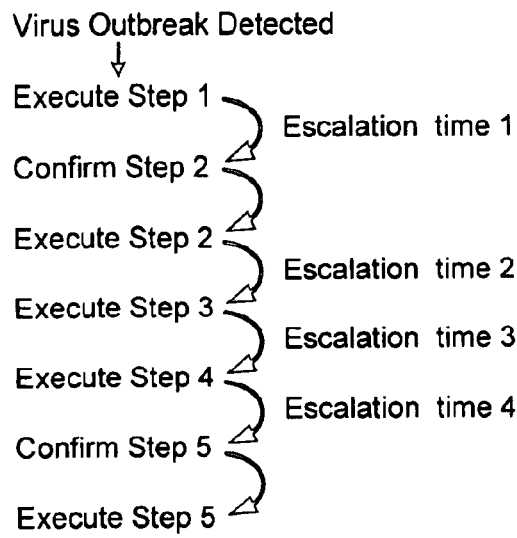

Virus Outbreak Detected
Execute Step 1
Escalation time 1
Confirm Step 2

Execute Step 2
Escalation time 2
Execute Step 3
Escalation time 3
Execute Step 4
Escalation time 4
Confirm Step 5

Execute Step 5

Legend:

Predefined Actions To Be Followed Upon Detection of Outbreak

Such actions may optionally include:
1. Reducing virus detection notification;
2. Switching from virus quarantining to virus deletion when a computer virus is detected;
3. Increasing scan options that control how thoroughly the computer system is scanned to detect a computer virus;
4. Sending a copy of the detected computer virus to a remote site for analysis;
5. Downloading a latest virus definition file from a remote site;
6. Performing a complete virus scan of all computer files stored in at least a portion of the computer apparatus;
7. Blocking e-mail attachments to block identical attachments appearing in excess of a threshold level;
8. Rendering non-accessible e-mail distribution lists and e-mail address books of e-mail clients coupled to the computer apparatus;
9. Restarting in administrator mode an e-mail post office coupled to the computer apparatus; and
10. Closing down an e-mail post office coupled to the computer apparatus.

FIG. 5

Emergency Response Event

Specify the actions and step to carry out:

| Step | Action | Escalation Time |
|---|---|---|
| 0 | Update DAT files (GroupShield Exc... | 0 hr(s) 1 min(s) |
| 1 | Reduce notifications (GroupShield ... | 0 hr(s) 10 min(s) |

[Move Up] [Move Down]　　[Add] [Remove]

☐ Create an emergency response report

[< Back] [Next >] [Cancel] [Help]

FIG. 16

Available Actions

| Component | Action |
|---|---|
| GroupShield Exchange | Delete on Infection |
| GroupShield Exchange | Reduce notifications |
| GroupShield Exchange | Hide Mailboxes |
| GroupShield Exchange | Hide distribution lists |
| GroupShield Exchange | Perform On-Demand Scan |
| GroupShield Exchange | Update DAT files |
| GroupShield Exchange | Down the Exchange Server |
| GroupShield Exchange | Increase Scanning Options |

Escalation Time

Escalate after : [0] hr(s) [0] min(s)

[OK] [Cancel]

FIG. 17

Emergency Response Event

Specify the name for this event :

Event1

Event Summary :

Event Name : 'Number of Identical Attachment types in a Time
Event Desc : 500 identical attachment types in 1 hours 20 minu
Reaction to an Emergency is Automatic
Email Notification is Enabled. Email will be sent to 'a@a.com'

Automatic Actions

Step, Action and escalation times

0     Update DAT files (0 hr(s) 1 min(s))

[ < Back ]  [ Finish ]  [ Cancel ]  [ Help ]

FIG. 18

RESPONSE TO A COMPUTER VIRUS OUTBREAK

BACKGROUND OF THE INVENTION

1. Field of the Invention

This invention relates to the field of data processing systems. More particularly, this invention relates to the response to an outbreak of a computer virus on a data processing system.

2. Description of the Prior Art

It is known to provide anti-virus systems for detecting computer viruses. Some known anti-virus systems will, upon user request, search for and automatically disinfect computer files that have been infected by a computer virus.

As the threat from computer viruses increases, there is a need for more robust anti-virus systems to deal with the threat. When a virus outbreak occurs within a computer system (an outbreak being more than the detection of a single virus infected file), then the various further steps that may be taken to reduce the spread and impact of the computer virus detection are numerous. An organisation having a large IT support system may have constantly available expert personnel able to deal with an outbreak when it occurs by applying the appropriate counter-measures. However, in many situations a computer virus may occur in circumstances where appropriate personnel able to deal with the virus outbreak are not available. Furthermore, the effects of a computer virus outbreak upon the normal operation of a computer system can be severe and in the midst of dealing with these consequences it is possible that certain useful counter-measures may be overlooked.

SUMMARY OF THE INVENTION

Viewed from one aspect the present invention provides a computer program product for responding to detection of an outbreak of a computer virus on a computer apparatus, said computer program product comprising:

(i) sequence data defining a sequence containing a plurality of predefined actions to be followed upon detection of said outbreak;

(ii) outbreak detection code operable to detect said outbreak; and (iii) sequence following code operable to follow said sequence of predefined actions.

The invention provides a system in which a sequence of actions may be predefined in advance of a computer outbreak occurring and the following of this sequence of predefined actions initiated upon detection of an outbreak of a computer virus. In this way, the strategy for dealing with a computer virus outbreak can be established in advance without the time pressures and confusion that can surround a real computer virus outbreak. Accordingly, a more methodical approach to the counter-measures is likely to be followed with a consequent higher likelihood of success. As an example, a corporate anti-virus expert could establish a sequence of actions to be followed on detection of a computer virus outbreak at all sites within that corporation. The technique of the invention enables the local computer system administrator faced with a rapidly developing and damaging virus outbreak to follow the corporate expert's recommended sequence of actions in a methodical fashion.

It will be appreciated that the predefined sequence of actions could be fixed. However, the most appropriate actions to be taken are likely to vary from computer system to computer system and accordingly it is preferred that the sequence of actions be user definable. Thus, the sequence may be set up in a manner matched to the particular system on which it is to operate.

It will be appreciated that a strong advantage of the invention is the ability of the sequence following code to automatically follow the sequence of predefined actions. This makes it possible for an appropriate response to occur to a computer virus outbreak even if there are no IT support personnel present, e.g. an out of hours computer virus outbreak. However, as some of the predefined actions that may be placed in the sequence can have very significant consequences for the computer system as a whole, preferred embodiments are such that, if required, one or more of the predefined actions is only performed after a user input confirming the predefined action is received (the action already selected, but a user is prompted before the action proceeds). As an example, a mail server shut down may be a possible counter-measure that is of sufficient seriousness that one would only wish it to be taken after confirmation from a user that this should be done.

It will be appreciated that the demands placed upon a computer system vary significantly with time. As an example, in the middle of the night or at the weekend a computer system for an office will usually be very lightly loaded. Accordingly, preferred embodiments of the invention allow that the sequence of predefined actions may be arranged to vary in dependence upon the time of day and/or the day of the week. As an example, an out of hours strategy that is significantly different from an business hours strategy may be established.

The predefined actions taken as counter-measures against the virus outbreak can vary significantly. As preferred examples of the type of predefined actions that can be placed within the sequence there are:

1. Reducing virus detection notifications to reduce server workload;
2. Switching from virus quarantine to virus deletion;
3. Increasing how thoroughly the computer system is scanned to detect a computer virus (e.g. changing to scanning files being read from and written to a server rather than just scanning files being written to a server);
4. Sending a copy of the detected virus to a remote site for analysis such that the anti-virus system provider can be made aware of what may be a new computer virus as soon as possible and so generate appropriate counter-measure tools for the user;
5. Downloading a latest virus definition file from a remote site in order to increase the likelihood that the counter-measures available to the system will be effective by using the very latest virus definitions and tools against what may be a newly released virus;
6. Performing a scan of all computer files stored in part or all of a computer system as a counter-measure that is likely to have a disadvantageous impact upon the computer system loading but may be justified by the severity of the virus outbreak;
7. Blocking E-mail attachments that appear in excess of a threshold level or blocking all E-mail attachments;
8. Rendering non-accessible E-mail distribution lists and E-mail address books of E-mail clients within the system in a manner aimed to reduce the likelihood of propagation of a computer virus; and
9. Restarting an E-mail post office or closing down an E-mail post office as a drastic measure to inhibit computer virus propagation.

Viewed from another aspect the invention also provides a method for responding to detection of an outbreak of a computer virus and an apparatus for responding to the detection of a computer virus.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 illustrates an example sequence of predefined actions that may be taken in response to a virus outbreak;

FIGS. 7 to 23 illustrate how the virus outbreak detection and automated sequence of response actions may be configured by a user.

DESCRIPTION OF THE PREFERRED EMBODIMENTS

Figure 1:
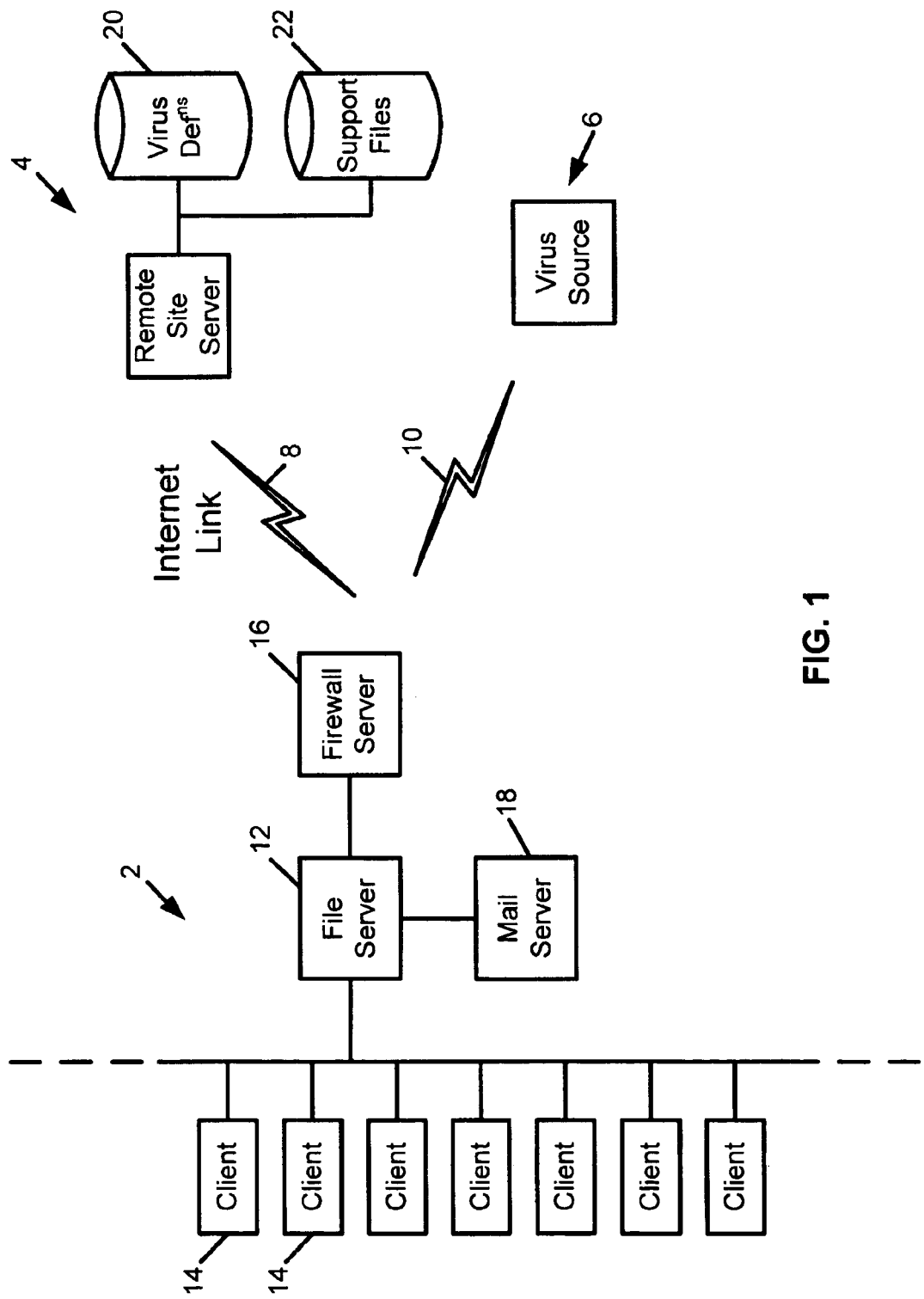
FIG. 1 schematically illustrates a computer system of the type it is desired to protect from computer viruses connected to other computer systems via network links.

FIG. 1 shows a computer system 2 coupled to remote computer systems 4 and 6 via internet network links 8, 10. The computer system 2 comprises a local area network. The local area network 2 is formed of a file server 12 to which a plurality of client computers 14 are linked by conventional local network connections. The file server 12 is linked to the remote computers 4, 6 via a firewall server 16 that serves to resist hacking and other security attacks. A mail server 18 coupled to the file server 12 provides E-mail services to the local area network 2. More particularly, the mail server 18 receives E-mail messages with associated attachments from remote computers.

A remote computer 6 may be a virus source. The virus source 6 may be unwitting in that it is merely passing on an infection it has itself incurred. Alternatively, the virus source 6 could be controlled by the virus originator. A computer virus may be introduced into the local area network 2 from the virus source 6 via an E-mail attachment, a security breach of the firewall server 16, a removable media introduced by a user or in some other way.

The local area network 2 is also coupled to a remote computer 4 that is controlled by the anti-virus system provider. This remote computer 4 includes a library of virus definitions 20 and a repository for suspect files 22. The anti-virus provider will frequently update the virus definitions stored by the remote computer 4 to reflect the latest viruses that have been discovered. Computer files suspected by users of the anti-virus system as being infected with a computer virus can be automatically sent to the suspect files repository 22 by the user computers so that they may be analysed as rapidly as possible by the anti-virus system provider.

Figure 2:
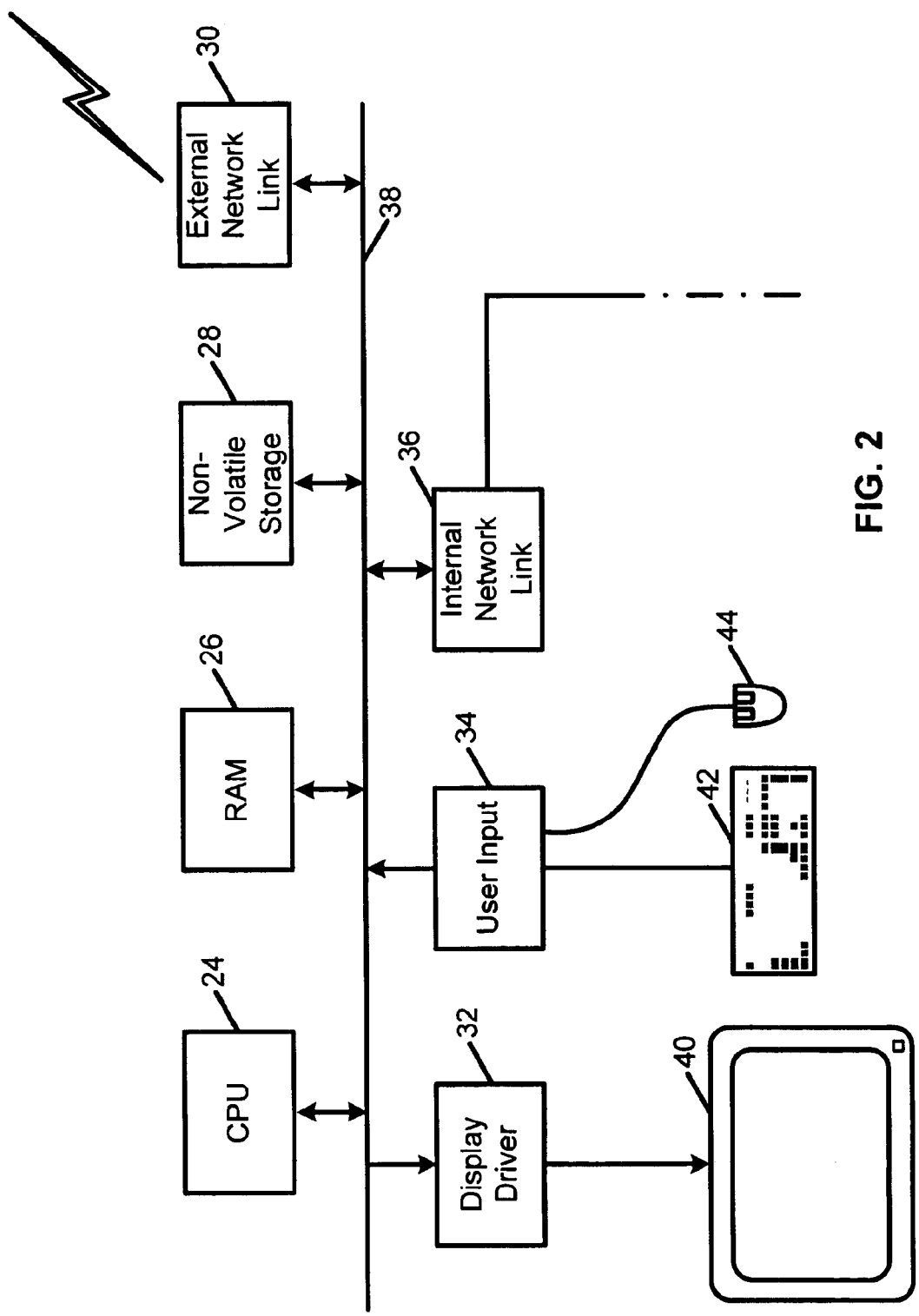
FIG. 2 illustrates a server computer for embodying one example of the present invention.

FIG. 2 schematically illustrates a general purpose computer of the type capable of executing the software which can embody the present invention. The computer includes a central processing unit 24, a working memory 26, a non-volatile memory 28 (such as a hard disk drive or an ROM), an external network link 30, a display driver 32, a user input interface 34 and an internal network link 36. The above items are linked via a common bus 38. A display monitor 40 is coupled to the display driver 32 and a keyboard 42 and a mouse 44 are coupled to the user input interface 34.

In operation, the computer system illustrated in FIG. 2 can execute a computer program stored within the non-volatile storage 28 using the working memory 26. The computer system may receive information or send information via either the external network link 30 or the internal network link 36. The computer software will control the display driver 32 to produce images and text upon the monitor 40 to enable a user manipulating the keyboard 42 and the mouse 44 to interact and control the computer program executing on the computer system.

The controlling computer program that controls the computer is stored in the non-volatile storage 28. The computer program may be recorded on a floppy disk, or a CD for distribution. Alternatively, the computer program may be obtained as a product by downloading via the external network link 30.

Figure 3:
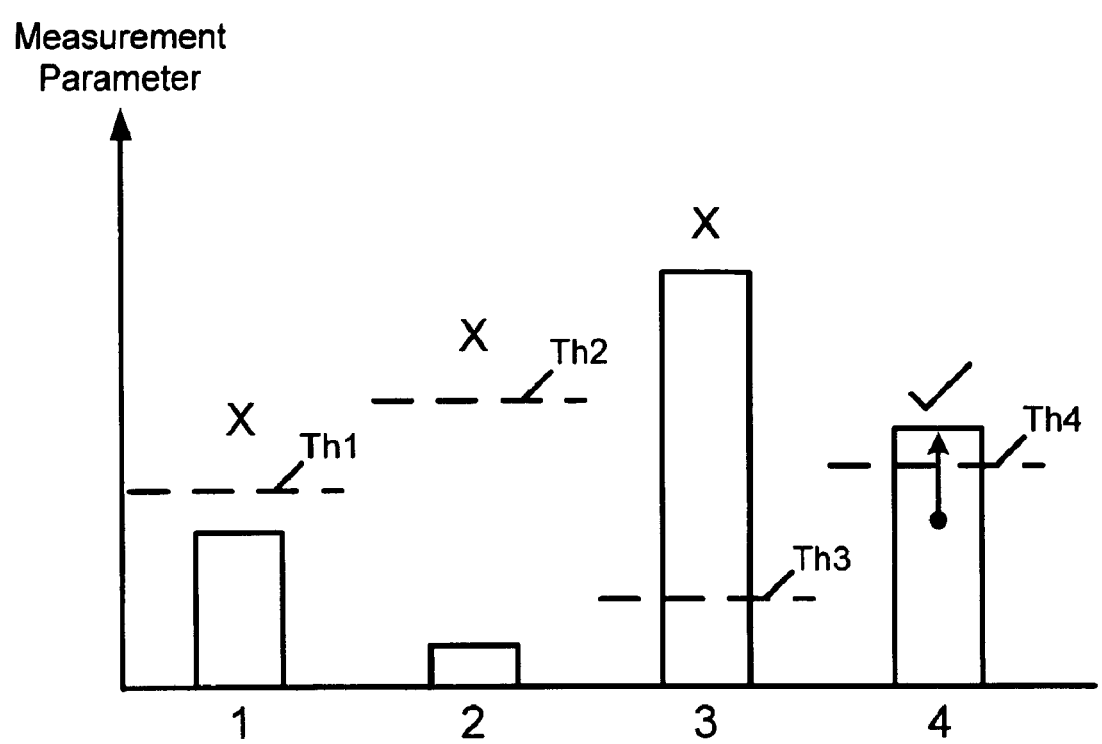
FIG. 3 illustrates the comparison between measurement parameters and predetermined threshold values.

The computer program executing on the computer system of FIG. 2 seeks to detect a virus outbreak by monitoring one or more measurement parameters obtained over a measurement period against predetermined threshold levels. This process is illustrated in FIG. 3. FIG. 3 shows four measurement parameters with their associated (user controlled) threshold levels Th1, Th2, Th3 and Th4. The computer program periodically checks each of the measurement parameters against its respective threshold to determine if that threshold has been crossed. In the case of the measurement parameters 1, 2 and 4, the normal state for these measurement parameters is less than their respective threshold values. Conversely, the normal state for the measurement parameter 3 is greater than its threshold value. In the example illustrated in FIG. 3, the measurement parameters 1, 2 and 3 are all normal whilst the measurement parameter 4 has crossed (exceeded) its threshold value (Th4) resulting in generation of a signal indicating an outbreak of a computer virus. The measurement parameters can take many different forms. Examples of suitable measurement parameters are:

1. How many E-mail messages are sent having an identical message title within a predetermined period;
2. How many E-mail messages are sent having an identical file attachment within a predetermined period;
3. How many E-mail messages are sent having a file attachment of a given file type (e.g. a EXE, COM or DOC) within a predetermined period;
4. How many E-mail messages are sent having a file attachment that is an executable file within a predetermined period; and
5. That the E-mail throughput measured as the number of messages multiplied by their size exceeds a predetermined level within a predetermined period.

It will be appreciated that the way in which the measurement parameters may be derived could take various different forms. The system could look at a rolling average over the measurement period, a peak value within a measurement period, a simple count of instances within a measurement period or various other measurements suited to the particular parameter concerned.

In the case of the above examples relating to E-mail behaviour on a computer system, existing computer E-mail program products, such as Microsoft Exchange Server (produced by Microsoft Corporation), already provide performance monitoring variables that may be read by other programs to gain information concerning the E-mail activity of the computer system. Similarly, many other measurement parameters are already available within computer systems as provided by operating systems or other computer programs executing on these systems. The computer program seeking to detect computer virus outbreaks can read and use these existing parameters. Alternatively, if desired, the computer program may include routines that themselves derive parameters indicative of the activity of the computer system. Conventional programming techniques may be used to derive these parameters.

Figure 4:
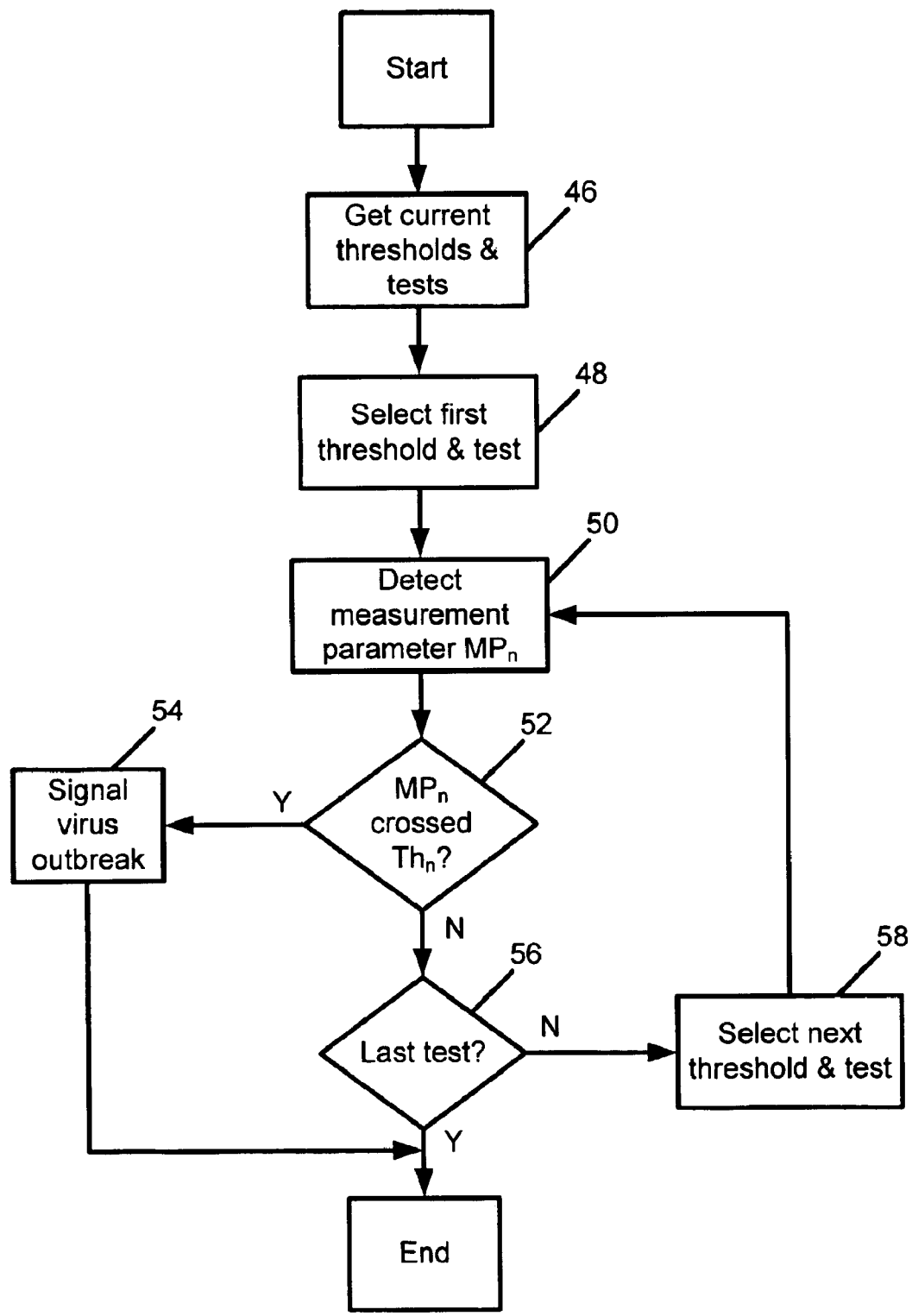
FIG. 4 is a flow diagram illustrating the process for detecting a virus outbreak.

FIG. 4 is a flow-diagram illustrating the computer virus outbreak detection technique of the present invention. At step 46 the system reads the current threshold levels and tests that are to be applied. The threshold levels and tests may be varied with the time of day and day of week in dependence upon a user defined schedule. As a simple example, a business hours and an out of hours set up may be configured with different tests and threshold levels being applied in these different respective periods. Step 46 serves to read the thresholds and tests that are to be applied at the current time and day.

Step 48 selects the first test from the list together with its associated threshold value and an indication of whether its normal state is above or below the threshold value.

Step 50 detects the measurement parameter $MP_n$ associated with the currently selected test. As previously mentioned, this may be read from another computer program or derived by the anti-virus system itself.

At step 52 the detected measurement parameter $MP_n$ is compared with its associated threshold value $Th_n$. If the threshold value is crossed, then processing proceeds to step 54 at which a signal indicating a virus outbreak is generated.

If the threshold value is not crossed, then processing proceeds to step 56 where a test is made to see if the last test has yet been reached. If the last test has not yet been reached, then the next test and threshold are selected at step 58 and processing is returned to step 50. If the last test has been reached, then processing terminates.

It will be appreciated that the process illustrated in the flow-diagram of FIG. 4 will be repeatedly executed at an interval that may be set so as to provide as rapid as needed detection of a virus outbreak without consuming an excessive amount of computer processing resources.

When a computer virus outbreak has been detected, then the system of the present invention provides an at least partially automated response to that detected outbreak following a predetermined sequence of actions. FIG. 5 illustrates this technique. Some of the steps require a user to confirm that they should be executed before they are executed. As shown in FIG. 5, steps 1, 3 and 4 execute automatically following expiry of their escalation time whereas steps 2 and 5 require user confirmation prior to being executed.

When the virus outbreak is detected, step 1 is immediately executed. If the virus outbreak is detected as persisting despite the execution of step 1 and after the expiry of the escalation time associated with step 1, then processing proceeds to seek confirmation that step 2 should be executed. Assuming such confirmation is received, then step 2 is executed and a determination made after an escalation time associated with step 2 as to whether or not the virus outbreak is still persisting. In this way, a predefined sequence of steps are executed spaced by appropriate escalation times set to allow the respective executed step to take effect in order that it may be determined whether or not the virus outbreak has been overcome. In general, the severity and adverse consequences of the various steps in the predefined sequence to the normal operation of the system upon which they reside increases as you progress through the sequence. Accordingly, it is desirable to check after the associated escalation time associated with each step as to whether or not it has been effective since this may avoid the need to execute a more severe counter-measure that would unnecessarily adversely affect the normal operation of the computer system.

The counter-measures that may be taken in the predefined sequence can vary considerably. As examples, given in an order that has been found to provide an appropriate balance between effectiveness and impact upon normal operation, are as follows:

1. Reducing virus detection notifications to reduce server workload;
2. Switching from virus quarantining to virus deletion when a virus is detected;
3. Increasing how thoroughly the computer system is scanned to detect computer viruses, e.g. the scanning options may be adjusted to scan all file types rather than just some file types, to scan files being read as well as files being written, or some other increase in the thoroughness of the scanning;
4. Automatically sending a copy of the detected computer virus to a remote site for analysis. Returning to FIG. 1, the local area network 2 may detect a computer virus outbreak and seek to deal with it via the automated response. At some stage in this response, the local area network 2 may send a copy of the computer virus across the internet link 8 to the suspect file repository 22 in the computer system 4 of the anti-virus system provider;
5. Downloading a latest version of the virus definitions file from a remote site in order to increase the likelihood of success of the counter-measures by using the very latest virus definitions. This latest virus definition library may be downloaded from the computer system 4 of the anti-virus system provider via the internet link 8 in a similar way to the preceding step of uploading a copy of the suspect file;
6. An "on demand" scan of all of the computer files stored on the file server 12, the firewall server 16, the mail server 18 and individual client computers 14 of the local area network 2 may be performed. Such an on-demand scan represents a considerable processing load and is likely to degrade the performance of the local area network 2 while it is taking place, but this may nevertheless be desirable if the computer virus outbreak has persisted despite the preceding counter-measures;
7. Blocking E-mail attachments that appear in excess of a threshold level or blocking all E-mail attachments. The measurement parameters of the E-mail system or bespoke routines within the anti-virus program may detect if particular files or types of files are associated with E-mails being sent or received upon the computer system that has the virus outbreak. If the number of attachments exceeds a predetermined threshold level, then the anti-virus system may interact with the E-mail systems to block further attachments of that file, that file type or all attachments;
8. A recent common type of virus is one that automatically reads a computer user's E-mail address book and distribution lists and then sends itself to those identified E-mail addresses as a way of propagating itself. A counter-measure effective against such viruses is to automatically hide or render inoperative all users' address books or distribution lists such that they may not be read and used by this type of virus;

9. A drastic step that may be taken against a sever virus outbreak is to shutdown the E-mail server 18 and either re-start it in Administrator only mode or not restart it at all. Such a drastic measure is highly likely to be effective against computer viruses using the E-mail services to propagate themselves, but clearly will have a severe adverse impact upon normal use of the computer system.

Figure 6:
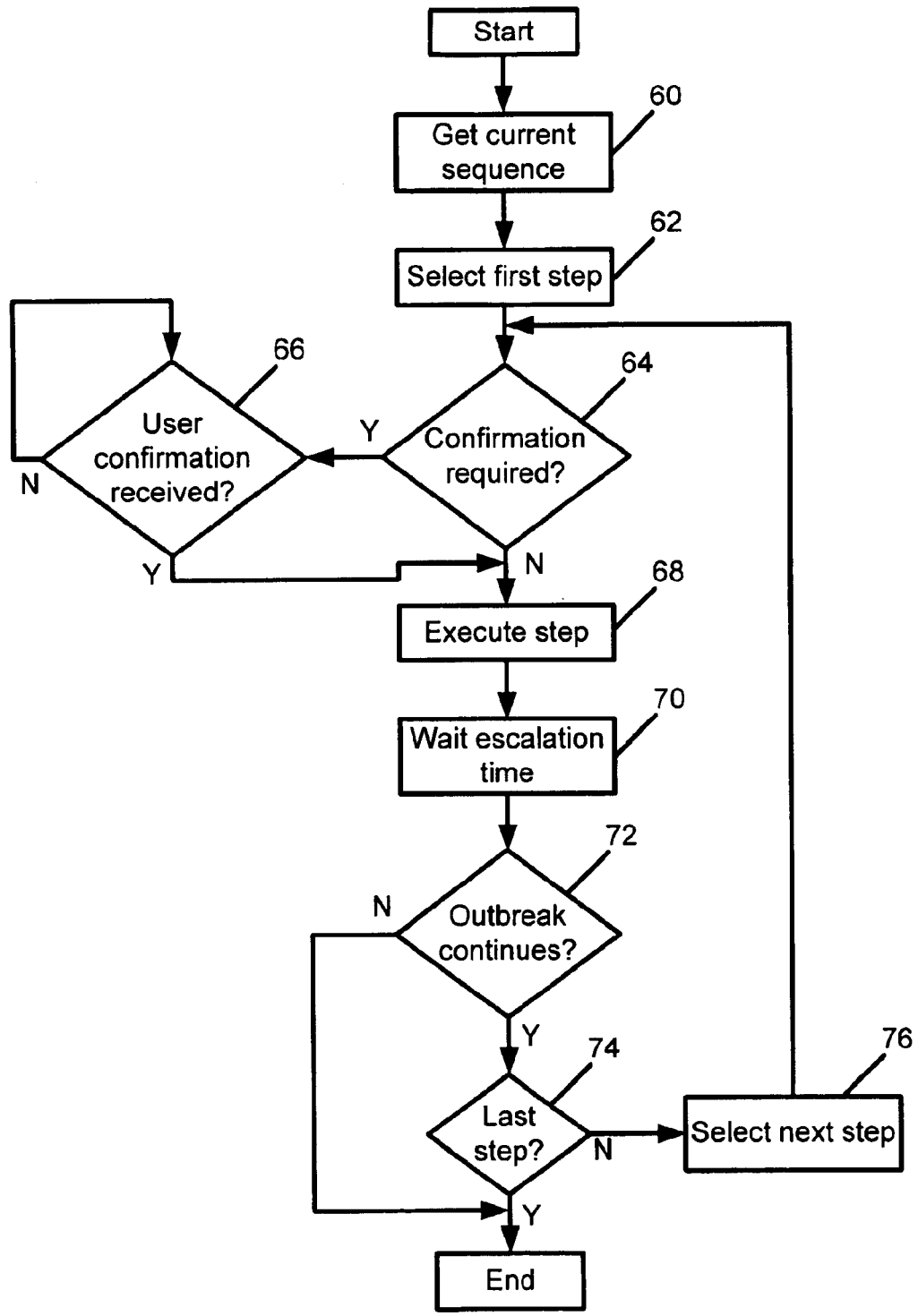
FIG. 6 is a flow diagram illustrating the process of taking a sequence of predefined actions in response to a virus outbreak.

FIG. 6 is a flow-diagram illustrating the sequence of predetermined steps (that may be automatic or prompted, possibly selected in dependence upon time) that may be followed in response to a detected virus outbreak.

At step 60, the latest sequence of steps appropriate to the particular time of day and day of week is read. As with the measurement parameters and threshold levels, the predetermined sequence can be varied in dependence upon the time of day and day of week to more appropriately match the use of the system at these times and the availability of support staff to interact with the systems upon occurrence of a virus outbreak.

At step 62 the first counter-measure step is selected. At step 64 a test is made as to whether user confirmation is required prior to execution of the currently selected step. If user confirmation is required, then this is sought via step 66 before processing proceeds to step 68 at which the selected step is executed. If confirmation is not required, then processing proceeds directly from step 64 to step 68.

Step 70 serves to wait for an escalation time associated with the current step after that step has been executed before a test is made at step 72 to determine whether the virus outbreak is continuing. The test applied at step 72 may comprise running the routine illustrated in FIG. 4.

If step 72 reveals that the outbreak has been stopped, then processing ends. If the outbreak is persisting, then processing proceeds to step 74 at which a determination is made as to whether or not the last step in the predetermined sequence of steps has yet been applied. If the last step has already been applied, then processing terminates. Alternatively, if the last step has not yet been applied, then processing proceeds to step 67 at which the next step is selected prior to returning processing to step 64.

A description of the set-up and user interaction with the computer program described above is given in the following description:

Configuration Wizard

The Configuration wizard User Interface (UI) is based on the approach taken in the Microsoft Outlook Rules wizard. The first dialog contains a list of user-defined events and re-actions (rules). These outbreak rules are listed in an order which determines the priority in which determination of an outbreak will occur. The user follows a set of wizard dialogs specifying the data they require for the outbreak event and action. The information is stored in an .INI file to aid in cross-platform portability.

Figure 7:
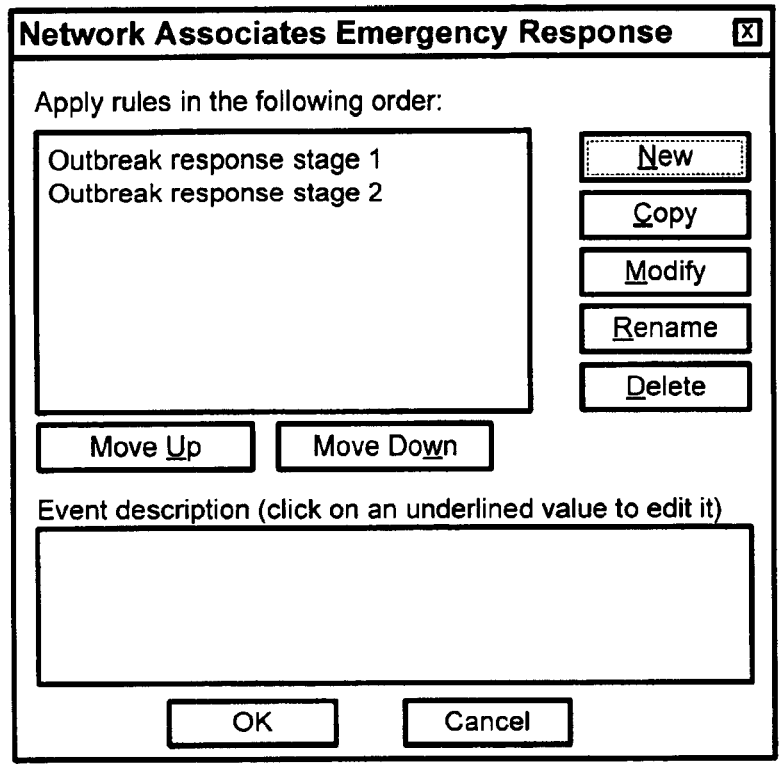

The initial dialog for the wizard (see FIG. 7) allows the user to add, copy, modify, rename and delete Outbreak rules for the system. You are also able to order the rules by priority using the move up and move down buttons. When the outbreak service (for example NT Service) is checking if outbreaks are occurring, it works its way down the list from the top to the bottom. The dialog also has a description pane to describe the rule whenever one is highlighted in the outbreak list.

Figure 8:
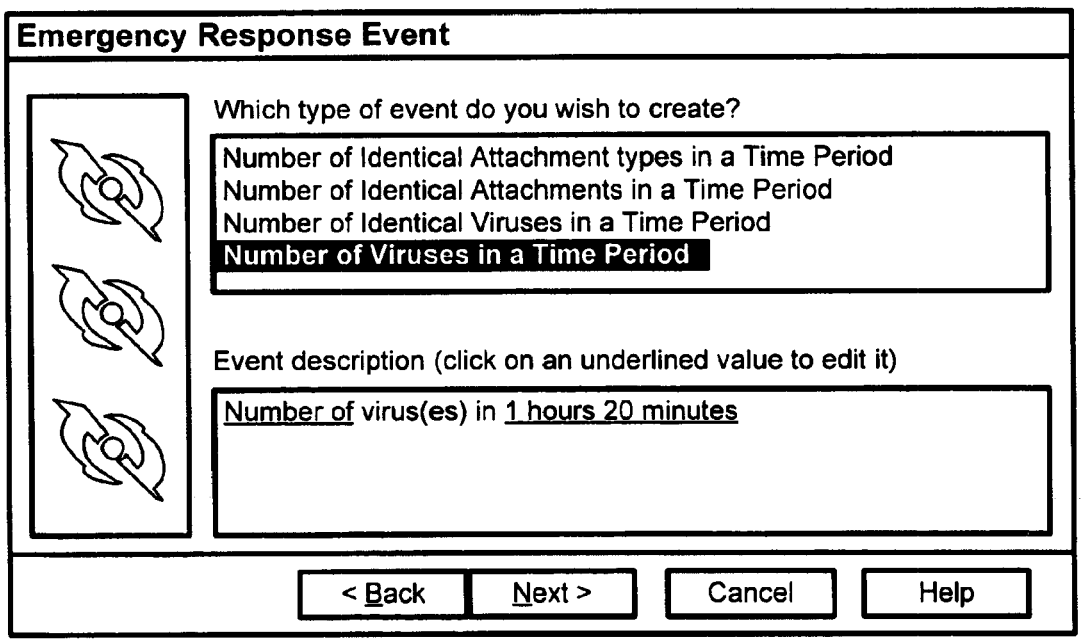

When the user presses new or modify they progress through the outbreak wizard pages starting with the one shown in FIG. 8.

Event Wizard Page

Figure 9:
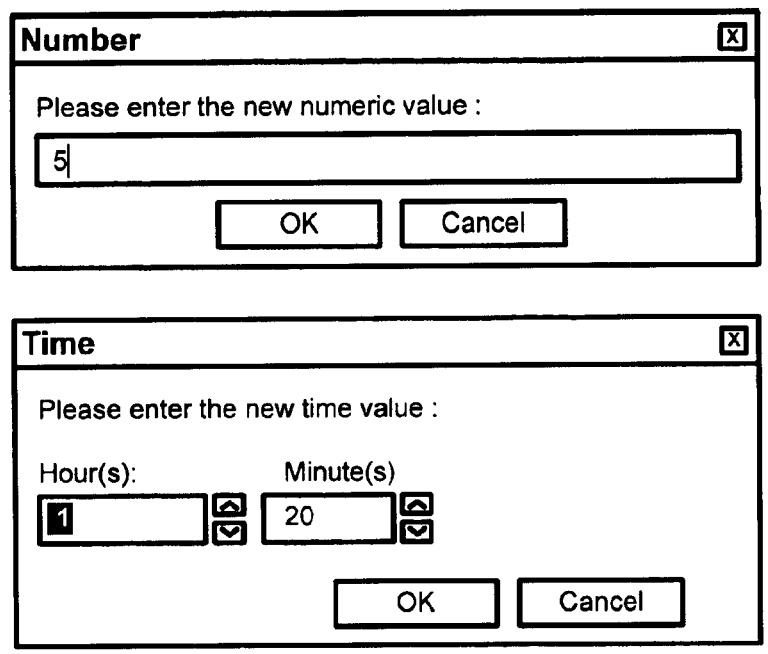

The wizard page functions similar to the Microsoft Outlook rules wizard. The user selects an event type in the event list and an English description appears below. There are a series of underlined words. The user clicks on these as if they were html links in a web browser. Upon clicking, a dialog appears asking them to enter a value (see FIG. 9). Once the value is entered it replaces the placeholder but is also underlined and clickable for the user to change/edit.

Figure 10:
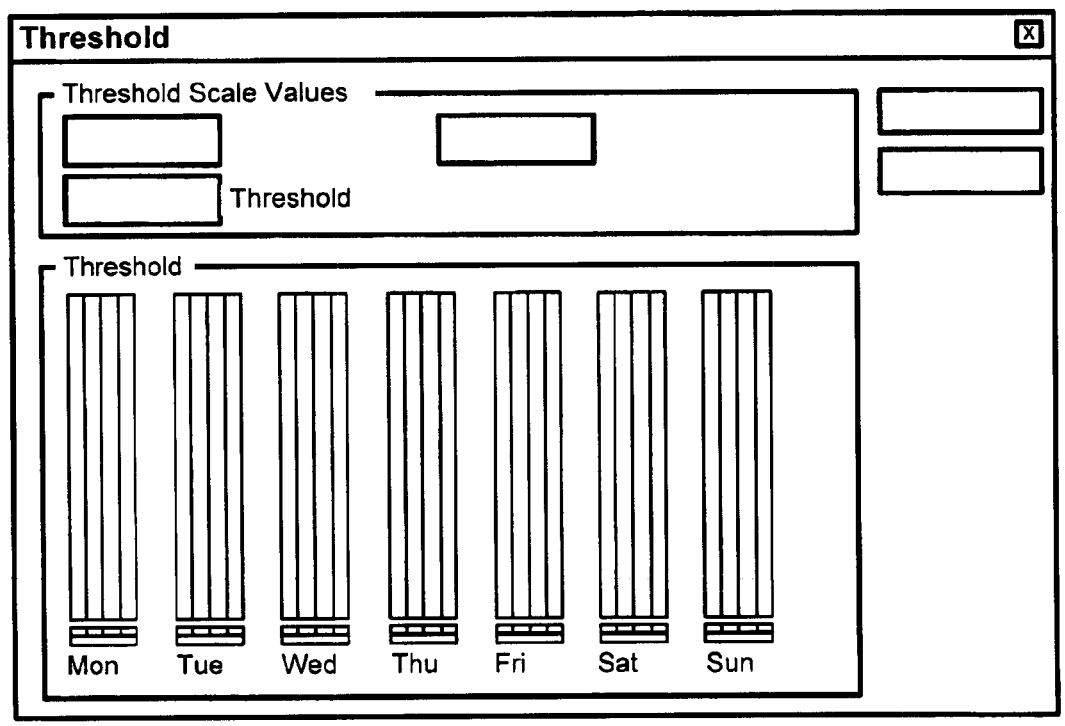

There is also a threshold event. This allows a user to set, for example, peak mail throughput thresholds for a period in the i.e. am, midday and pm (see FIG. 10).

Upon specifying the event required for an outbreak. The user can click next to move onto the next wizard page. They are not able to progress until the relevant event values have been filled out (in accordance with the table below).

Figures 11, 12, 13:
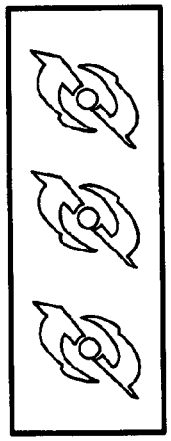

Upon clicking the Next button, the wizard in FIG. 11 is displayed.

| Name | Type | Details |
| --- | --- | --- |
| Number of hours | Numeric | 0–23 |
| Number of minutes | Numeric | 0–59 |
| Threshold minimum | Numeric | None |
| Threshold maximum | Numeric | None |
| Threshold value | Numeric | None |

Reaction Type Wizard Page

Figure 14:
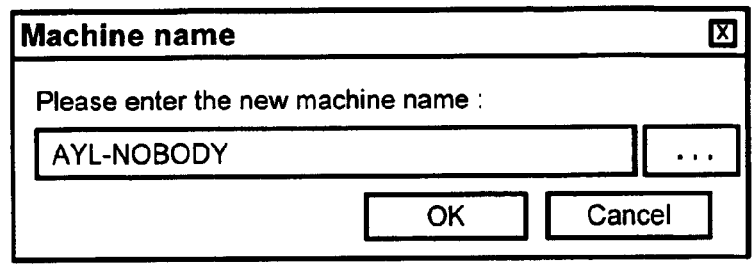
Figure 15:
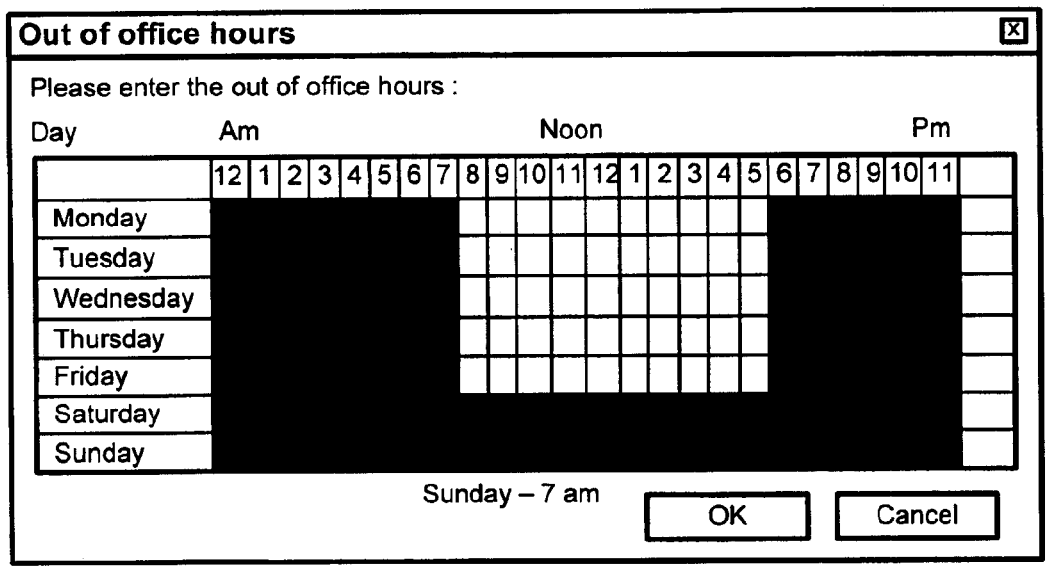

The user is then able to specify the action they require upon an outbreak being detected. There are two categories of action, Manual and Automatic. Upon selection of Manual, the user can specify to be notified via email, network broadcast or pager. They then fill out any notification details using the html type links (See FIGS. 12, 13 and 14). Upon selecting out of office hours, the user enters the times they are out of the office during the week. FIG. 15 shows the selection control which functions in the same manner as the scheduling control in Microsoft Exchange Administrator for scheduling replication.

Once all the values have been filled out for manual notifications, the user continues to either the finish wizard page or the reactions page depending upon what has been selected. If manual reaction has been selected, the reaction page will only appear if they have selected "Use out of office hours."

Data Validation for Notification

| Name | Type | Details |
| --- | --- | --- |
| Email Address | Alpha Numeric | Valid Email Format i.e. Has . and @ symbols |
| Pager Numer | Numeric | None |
| Network Broadcast | Alpha Numeric | Valid Computer name |

Automatic Virus Reaction Wizard Page

Upon completing the reaction type, the user is presented with the wizard page shown in FIG. 16. The user then has the ability to add and remove items from the list using the buttons at the bottom of the list. The add button will bring up a dialog displaying a choice of available actions to take as in FIG. 17. The move up and move down buttons allow the user to specify the order in which the reactions are carried out. They are then able to specify a time period in which to escalate to the next item in the list. The user can have one or more reaction types in the list. Escalations work down the list from top to bottom. Upon reaching the last item and the event still firing, then notifications will be sent to an administrator via e-mail. An escalation occurs if the event is still firing after the time period for the current action has been exceeded.

The user is also able to specify an outbreak report created (in a file on the hard disk) upon an outbreak being detected. This provides a history of what has happened during detection and automated reaction (an audit trail). The report option defaults to on.

For any action that is considered extreme, the user will be warned via a message box to ensure that they are aware of the data entered.

Data Validation for Escalation

| Name | Type | Details |
|---|---|---|
| Escalation hours | Numeric | None |
| Escalation minutes | Numeric | 0–59 |

Outbreak Summary Wizard Page

Lastly the summary wizard page shows what has been completed during the earlier pages. When the user clicks finish they will return to the dialog shown in FIG. 7.

Outbreak Wizard Flowchart

Figure 19:
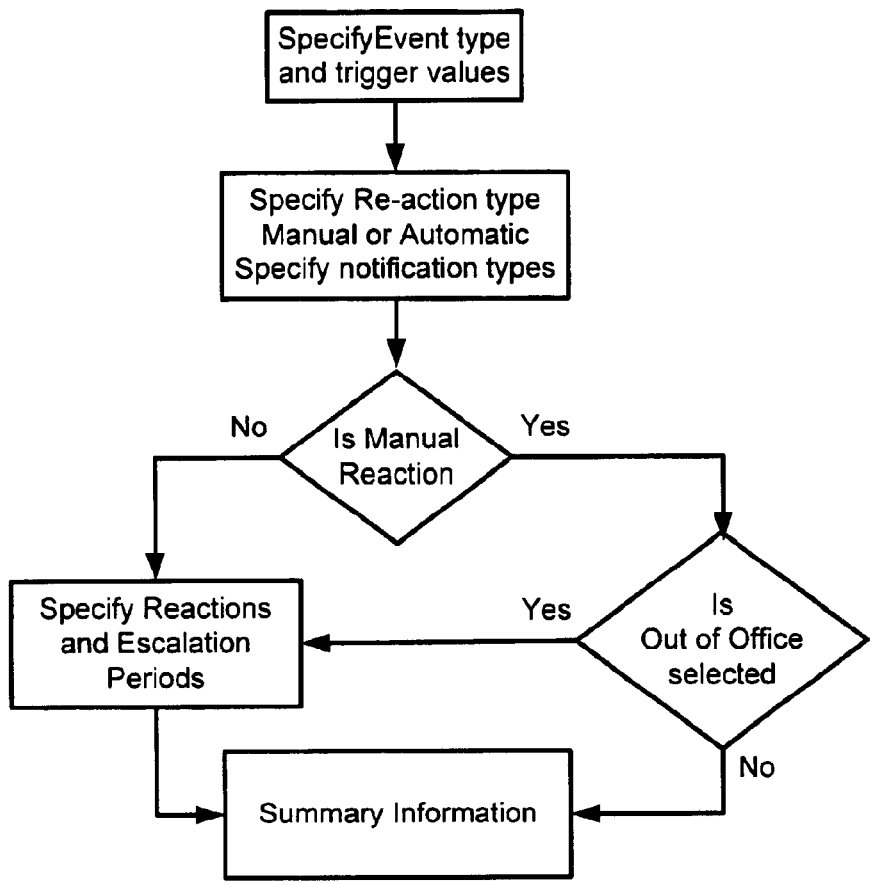

See FIG. 19.

Outbreak Service

Figure 20:
Figure 21:
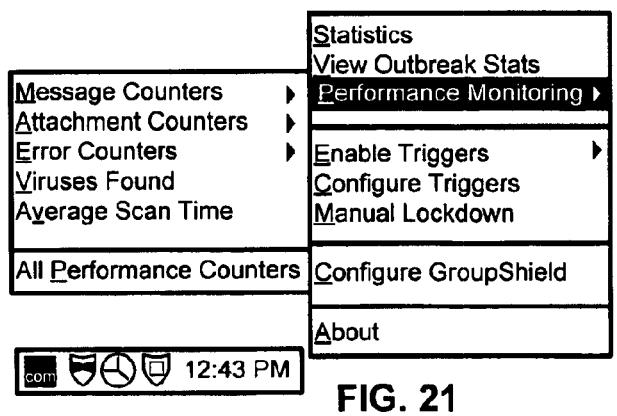

The outbreak service runs as an NT service and can be stopped and started using the services applet in the control panel. The service runs under the system account and therefore can interact with the desktop. There is an icon added to the task bar tray (see FIG. 20) which provides a popup menu (see FIG. 21).

Figure 22:
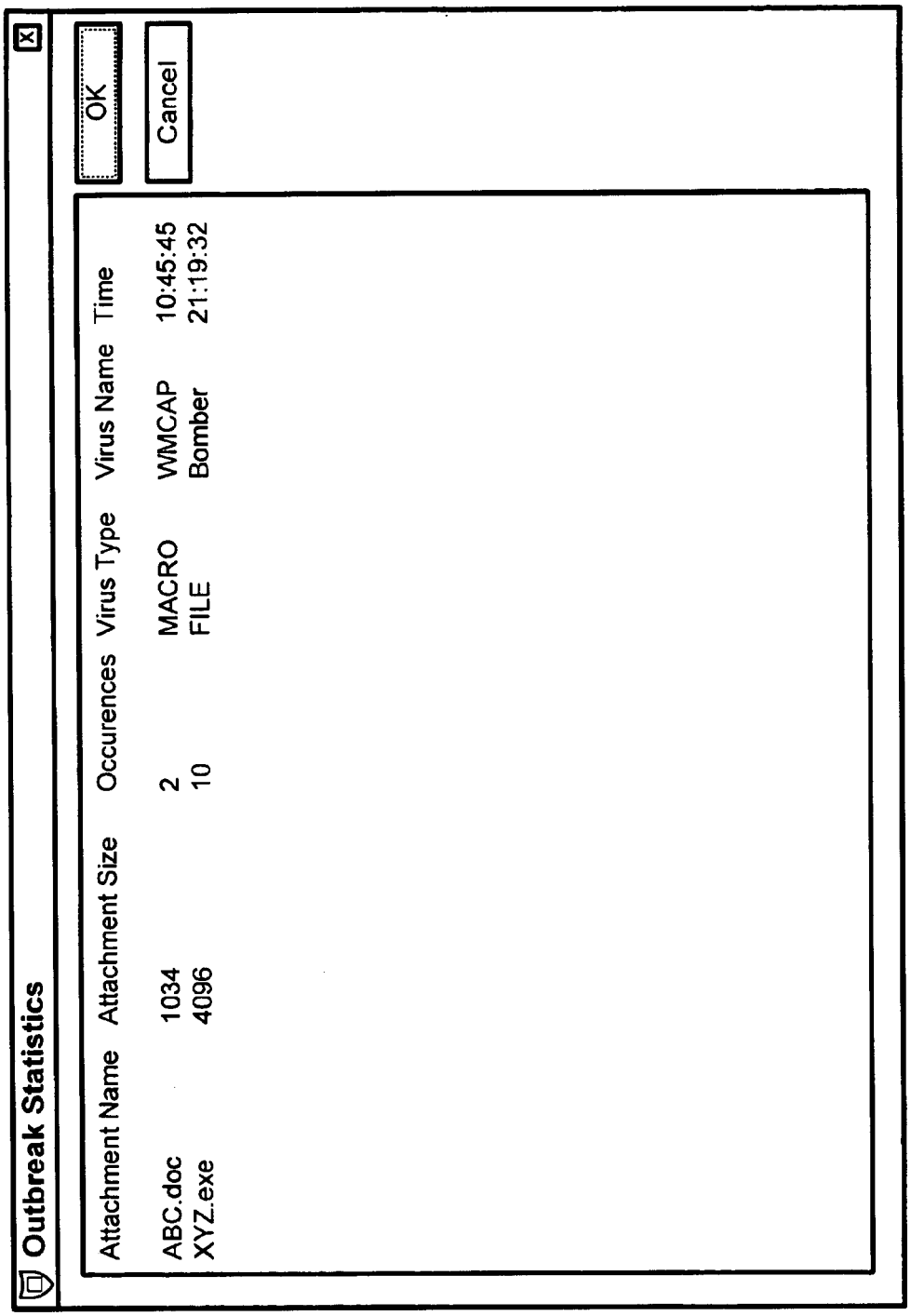

The popup menu provides the ability to view general statistics (i.e. when outbreak thresholds were exceeded and what actions were taken) and outbreak event specific statistics (see FIG. 22). The outbreak event statistics display enough information to the user to be able to intelligently set the outbreak thresholds for the event.

Figure 23:
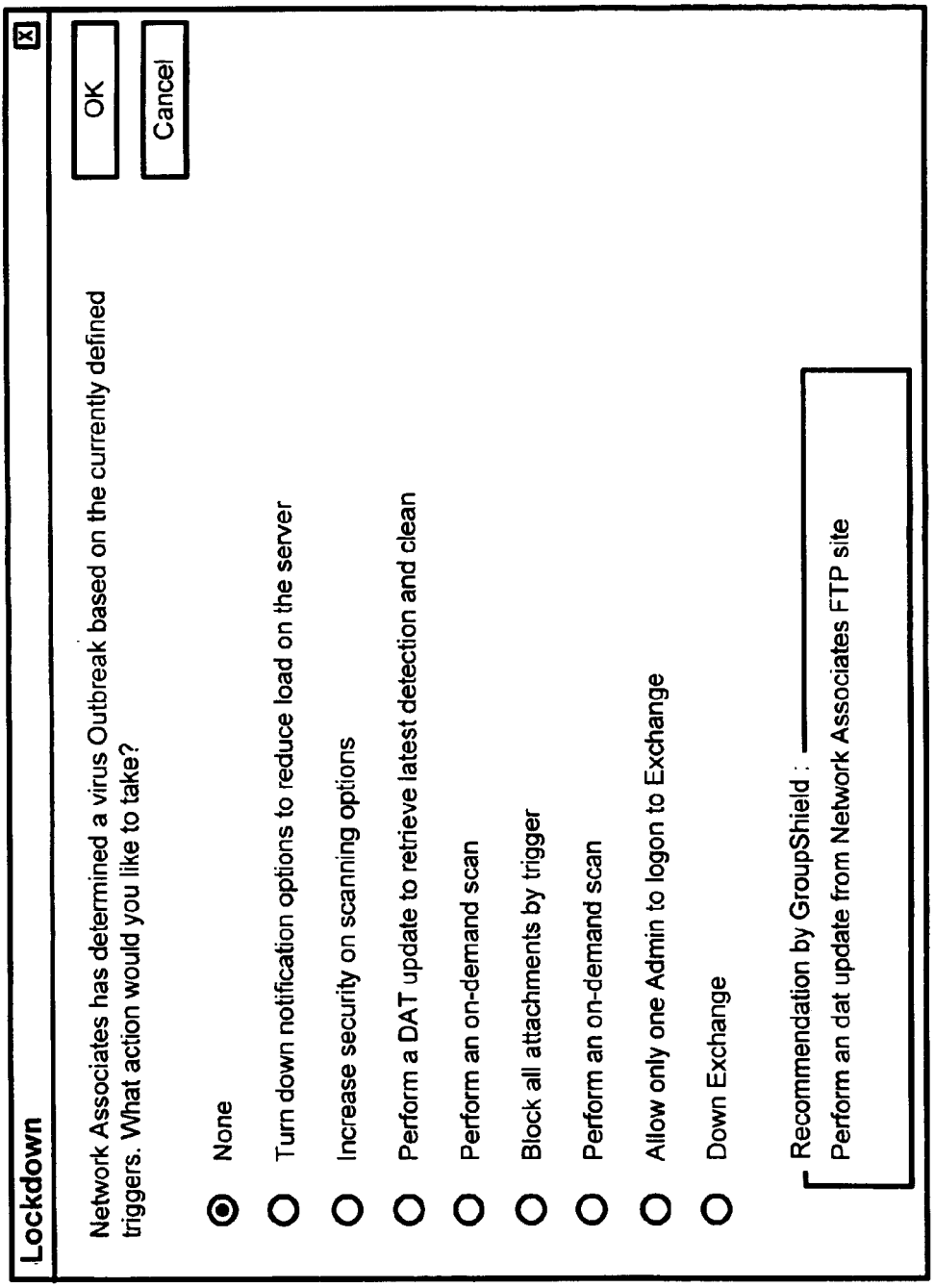

The outbreak service upon a manual event displays the lock down dialog (see FIG. 23) with a list of actions to take. This is also available from the popup menu whenever the user requires. They are then able to select the required action. The UI will only appear on the server that is running the outbreak service.

Outbreak events are also enabled/disabled via the popup menu. A tick is placed along side each event that is currently enabled. The popup menu is also able to spawn the performance monitor along with the relevant perfmon work spaces. This will allow the application performance counters to be loaded and configured in performance monitor.

The configuration of the app can also be started from the popup menu. In this case it will load Microsoft Exchange admin.exe.

Appendix A

Events and actions are described below for the Microsoft Exchange version of the product.

Events

Number of viruses over a time period

Number of identical viruses over a time period

Number of identical attachments over a time period

Number of identical attachment types over a time period

Number of viruses per user over time (On-demand scan only???)

Throughput>Threshold

Delta from previous 24 hours (Number of virus over twenty four hours)

Actions

Actions will be Manual or Automatic. Manual will notify the user only and not perform any actions unless "Use out of office hours" is specified and the event is triggered during the specified out of office hours.

Notify user (e-mail, pager, network broadcast).

Reduce notifications to reduce server load.

Set to delete on infection instead of current quarantining setting to reduce load.

Increase the scan options—scan all files, enable all heuristics.

Perform a DAT update.

Perform an on-demand scan.

Block the items that caused the event (i.e. 500. docs in an hour triggered an event, so block all. doc files.

Block all attachments.

Hide Distribution lists to prevent E-mail enabled viruses from E-maling themselves to large groups of people.

Hide Mailboxes to prevent E-mail enabled viruses from E-mailing themselves to your users.

Down the Exchange server and bring back up only allowing the admin to log on.

Down Exchange and leave it down.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a computer readable medium for responding to detection of an outbreak of a computer virus on a computer apparatus, said computer program product comprising:

(i) sequence data defining a sequence containing a plurality of predefined actions to be followed upon detection of said outbreak;

(ii) outbreak detection code operable to detect said outbreak; and (iii) sequence following code operable to follow said sequence of predefined actions;

wherein said sequence of predefined actions varies in dependence upon time of day.

2. A computer program product as claimed in claim 1, wherein said sequence of predefined actions is user defined.

3. A computer program product as claimed in claim 1, wherein one or more of said predefined actions is performed after receipt of a user input confirming said predefined action.

4. A computer program product as claimed in claim 1, wherein one of said predefined actions is reducing virus detection notifications.

5. A computer program product as claimed in claim 1, wherein one of said predefined actions is switching from virus quarantining to virus deletion when a computer virus is detected.

6. A computer program product as claimed in claim 1, wherein one of said predefined actions is increasing scan options that control how thoroughly said computer system is scanned to detect a computer virus.

7. A computer program product as claimed in claim 1, wherein one of said predefined actions is sending a copy of said detected computer virus to a remote site for analysis.

8. A computer program product as claimed in claim 1, wherein one of said predefined actions is downloading a latest virus definition file from a remote site.

9. A computer program product as claimed in claim 1, wherein one of said predefined actions is downloading a latest virus definition file from a remote site.

10. A computer program product as claimed in claim 1, wherein one of said predefined actions is performing a complete virus scan of all computer files stored in at least a portion of said computer apparatus.

11. A computer program product embodied on a computer readable medium for responding to detection of an outbreak of a computer virus on a computer apparatus, said computer program product comprising:
   (i) sequence data defining a sequence containing a plurality of predefined actions to be followed upon detection of said outbreak;
   (ii) outbreak detection code operable to detect said outbreak; and
   (iii) sequence following code operable to follow said sequence of predefined actions;
      wherein said sequence of predefined actions varies in dependence upon day of week.

12. A computer program product embodied on a computer readable medium for responding to detection of an outbreak of a computer virus on a computer apparatus, said computer program product comprising:
   (i) sequence data defining a sequence containing a plurality of predefined actions to be followed upon detection of said outbreak;
   (ii) outbreak detection code operable to detect said outbreak; and
   (iii) sequence following code operable to follow said sequence of predefined actions;
      wherein one of said predefined actions is blocking e-mail attachments;
      wherein said predefined action of blocking e-mail attachments blocks identical attachments appearing in excess of a threshold level.

13. A computer program product embodied on a computer readable medium for responding to detection of an outbreak of a computer virus on a computer apparatus, said computer program product comprising:
   (i) sequence data defining a sequence containing a plurality of predefined actions to be followed upon detection of said outbreak;
   (ii) outbreak detection code operable to detect said outbreak; and
   (iii) sequence following code operable to follow said sequence of predefined actions;
      wherein one of said predefined actions is rendering non-accessible e-mail distribution lists and e-mail address books of e-mail clients coupled to said computer apparatus.

14. A computer program product embodied on a computer readable medium for responding to detection of an outbreak of a computer virus on a computer apparatus, said computer program product comprising:
   (i) sequence data defining a sequence containing a plurality of predefined actions to be followed upon detection of said outbreak;
   (ii) outbreak detection code operable to detect said outbreak; and
   (iii) sequence following code operable to follow said sequence of predefined actions;
      wherein one of said predefined actions is restarting in administrator mode an e-mail post office coupled to said computer apparatus.

15. A computer program product embodied on a computer readable medium for responding to detection of an outbreak of a computer virus on a computer apparatus, said computer program product comprising:
   (i) sequence data defining a sequence containing a plurality of predefined actions to be followed upon detection of said outbreak;
   (ii) outbreak detection code operable to detect said outbreak; and
   (iii) sequence following code operable to follow said sequence of predefined actions;
      wherein one of said predefined actions is closing down an e-mail post office coupled to said computer apparatus.

16. A method of responding to detection of an outbreak of a computer virus on a computer apparatus, said method comprising:
   (i) defining a sequence containing a plurality of predefined actions to be followed upon detection of said outbreak;
   (ii) detecting said outbreak; and
   (iii) following said sequence of predefined actions;
      wherein said sequence of predefined actions varies in dependence upon time of day;
      wherein said sequence of predefined actions is user defined.

17. A method of responding to detection of an outbreak of a computer virus on a computer apparatus, said method comprising:
   (i) defining a sequence containing a plurality of predefined actions to be followed upon detection of said outbreak;
   (ii) detecting said outbreak; and
   (iii) following said sequence of predefined actions;
      wherein said sequence of predefined actions varies in dependence upon time of day;
      wherein one or more of said predefined actions is performed after receipt of a user input confirming said predefined action.

18. A method of responding to detection of an outbreak of a computer virus on a computer apparatus, said method comprising:
   (i) defining a sequence containing a plurality of predefined actions to be followed upon detection of said outbreak;
   (ii) detecting said outbreak; and
   (iii) following said sequence of predefined actions;
      wherein said sequence of predefined actions varies in dependence upon time of day;
      wherein one of said predefined actions is reducing virus detection notifications.

19. A method of responding to detection of an outbreak of a computer virus on a computer apparatus said method comprising:
   (i) defining a sequence containing a plurality of predefined actions to be followed upon detection of said outbreak;
   (ii) detecting said outbreak; and
   (iii) following said sequence of predefined actions;

wherein said sequence of predefined actions varies in dependence upon time of day;
wherein one of said predefined actions is switching from virus quarantining to virus deletion when a computer virus is detected.

20. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein said sequence of predefined actions varies in dependence upon time of day;
wherein one of said predefined actions is increasing scan options that control how thoroughly said computer system is scanned to detect a computer virus.

21. A method of responding to detection of an outbreak of a computer virus on a computer apparatus said method comprising:
(i) defining a sequence containing a plurality of predefined actions to be followed upon detection of said outbreak;
(ii) detecting said outbreak; and
(iii) following said sequence of predefined actions;
wherein said sequence of predefined actions varies in dependence upon time of day;
wherein one of said predefined actions is sending a copy of said detected computer virus to a remote site for analysis.

22. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein said sequence of predefined actions varies in dependence upon time of day;
wherein one of said predefined actions is downloading a latest virus definition file from a remote site.

23. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein said sequence of predefined actions varies in dependence upon time of day;
wherein one of said predefined actions is performing a complete virus scan of all computer files stored in at least a portion of said computer apparatus.

24. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein one of said predefined actions is blocking e-mail attachments;
wherein said predefined action of blocking e-mail attachments blocks identical attachments appearing in excess of a threshold level.

25. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein one of said predefined actions is rendering non-accessible e-mail distribution lists and e-mail address books of e-mail clients coupled to said computer apparatus.

26. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein one of said predefined actions is restarting in administrator mode an e-mail post office coupled to said computer apparatus.

27. A method of responding to detection of an outbreak of a computer virus on a computer apparatus, said method comprising:
(i) defining a sequence containing a plurality of predefined actions to be followed upon detection of said outbreak;
(ii) detecting said outbreak; and
(iii) following said sequence of predefined actions;
wherein one of said predefined actions is closing down an e-mail post office coupled to said computer apparatus.

28. A system including a computer program product embodied on a computer readable medium for responding to detection of an outbreak of a computer virus on a computer apparatus, said computer program product comprising:
sequence data storage storing sequence data defining a sequence containing a plurality of predefined actions to be followed upon detection of said outbreak;
outbreak detection logic operable to detect said outbreak; and
sequence following logic operable to follow said sequence of predefined actions;
wherein said sequence of predefined actions varies in dependence upon time of day.

29. A computer program product as claimed in claim 28, wherein said sequence of predefined actions is user defined.

30. A computer program product as claimed in claim 28, wherein one or more of said predefined actions is performed after receipt of a user input confirming said predefined action.

31. A computer program product as claimed in claim 28, wherein one of said predefined actions is reducing virus detection notifications.

32. A computer program product as claimed in claim 28, wherein one of said predefined actions is switching from virus quarantining to virus deletion when computer virus is detected.

33. A computer program product as claimed in claim 28, wherein one of said predefined actions is increasing scan options that control how thoroughly said computer system is scanned to detect a computer virus.

34. A computer program product as claimed in claim 28, wherein one of said predefined actions is sending a copy of said detected computer virus to a remote site for analysis.

35. A computer program product as claimed in claim 28, wherein one of said predefined actions is downloading a latest virus definition file from a remote site.

36. A computer program product as claimed in claim 28, wherein one of said predefined actions is downloading a latest virus definition file from a remote site.

37. A computer program product as claimed in claim 28, wherein one of said predefined actions is performing a complete virus scan of all computer files stored in at least a portion of said computer apparatus.

38. A system including a computer program product embodied on a computer readable medium for responding to detection of an outbreak of a computer virus on a computer apparatus, said computer program product comprising:

sequence data storage storing sequence data defining a sequence containing a plurality of predefined actions to be followed upon detection of said outbreak;

outbreak detection logic operable to detect said outbreak; and sequence following logic operable to follow said sequence of predefined actions;

wherein said sequence of predefined actions varies in dependence upon day of week.

39. A system including a computer program product embodied on a computer readable medium for responding to detection of an outbreak of a computer virus on a computer apparatus, said computer program product comprising:

sequence data storage storing sequence data defining a sequence containing a plurality of predefined actions to be followed upon detection of said outbreak;

outbreak detection logic operable to detect said outbreak; and sequence following logic operable to follow said sequence of predefined actions;

wherein one of said predefined actions is blocking e-mail attachments;

wherein a said predefined action of blocking e-mail attachments blocks identical attachments appearing in excess of a threshold level.

40. A system including a computer program product embodied on a computer readable medium for responding to detection of an outbreak of a computer virus on a computer apparatus, said computer program product comprising:

sequence data storage storing sequence data defining a sequence containing a plurality of predefined actions to be followed upon detection of said outbreak;

outbreak detection logic operable to detect said outbreak; and sequence following logic operable to follow said sequence of predefined actions;

wherein one of said predefined actions is rendering non-accessible e-mail distribution lists and e-mail address books of e-mail clients coupled to said computer apparatus.

41. A system including a computer program product embodied on a computer readable medium for responding to detection of an outbreak of a computer virus on a computer apparatus, said computer program product comprising:

sequence data storage storing sequence data defining a sequence containing a plurality of predefined actions to be followed upon detection of said outbreak;

outbreak detection logic operable to detect said outbreak; and sequence following logic operable to follow said sequence of predefined actions;

wherein one of said predefined actions is restarting in administrator mode an e-mail post office coupled to said computer apparatus.

42. A system including a computer program product embodied on a computer readable medium for responding to detection of an outbreak of a computer virus on a computer apparatus, said computer program product comprising:

sequence data storage storing sequence data defining a sequence containing a plurality of predefined actions to be followed upon detection of said outbreak;

outbreak detection logic operable to detect said outbreak; and sequence following logic operable to follow said sequence of predefined actions;

wherein one of said predefined actions is closing down an e-mail post office coupled to said computer apparatus.

* * * * *